United States Patent
Harada et al.

(10) Patent No.: US 12,033,401 B2
(45) Date of Patent: Jul. 9, 2024

(54) DRIVING ASSISTANCE DEVICE FOR VEHICLE

(71) Applicant: SUBARU CORPORATION, Tokyo (JP)

(72) Inventors: Reo Harada, Tokyo (JP); Masayoshi Koiji, Tokyo (JP); Otoki Yagi, Tokyo (JP); Tomomi Heta, Tokyo (JP); Cong Kien Nguyen, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 63 days.

(21) Appl. No.: 17/829,870

(22) Filed: Jun. 1, 2022

(65) Prior Publication Data

US 2022/0415060 A1    Dec. 29, 2022

(30) Foreign Application Priority Data

Jun. 29, 2021   (JP) .................................. 2021-107501

(51) Int. Cl.
   *G01C 21/00*   (2006.01)
   *G01C 21/34*   (2006.01)
   *G06V 20/56*   (2022.01)
   *G06V 20/58*   (2022.01)
   *B62D 15/02*   (2006.01)

(52) U.S. Cl.
   CPC ....... *G06V 20/586* (2022.01); *G01C 21/3461* (2013.01); *G06V 20/588* (2022.01); *B62D 15/027* (2013.01)

(58) Field of Classification Search
   CPC ............... G06V 20/586; G06V 20/588; G01C 21/3461; G01C 21/3602; G01C 21/3685; G01C 21/00; B62D 15/027; B62D 15/0285
   USPC ......................................................... 701/423
   See application file for complete search history.

(56) References Cited

U.S. PATENT DOCUMENTS

| | | | | |
|---|---|---|---|---|
| 9,666,073 | B1 * | 5/2017 | Lin ........................ | G06Q 50/30 |
| 2015/0344031 | A1 * | 12/2015 | Weisswange ......... | B60W 30/14 |
| | | | | 701/1 |
| 2016/0214646 | A1 * | 7/2016 | Yang .................... | B62D 15/027 |
| 2017/0297624 | A1 * | 10/2017 | Noh ......................... | B60R 1/00 |

(Continued)

FOREIGN PATENT DOCUMENTS

JP    2018-149983 A    9/2018

*Primary Examiner* — Shardul D Patel
(74) *Attorney, Agent, or Firm* — Rimon PC

(57) ABSTRACT

A driving assistance device for a vehicle includes a traveling environment recognizer, a parking space detector, an evaluation value calculator, and a parking space setter. The traveling environment recognizer is configured to recognize traveling environment information related to an outside of the vehicle. The parking space detector is configured to, in a case where the vehicle has entered a parking lot, detect one or more parking spaces available to the vehicle based on the traveling environment information. The evaluation value calculator is configured to calculate one or more evaluation values for the one or more parking spaces, each of the one or more evaluation values including an exit hindrance factor as an evaluation item. The parking space setter is configured to select, with priority, a parking space for parking the vehicle from among the one or more parking spaces. The evaluation value of the parking space is relatively high.

20 Claims, 10 Drawing Sheets

(56) References Cited

U.S. PATENT DOCUMENTS

| | | | |
|---|---|---|---|
| 2018/0099661 A1* | 4/2018 | Bae | B62D 15/0285 |
| 2018/0180731 A1* | 6/2018 | Inoue | G01S 15/931 |
| 2018/0265129 A1* | 9/2018 | Ayyappan | B62D 15/027 |
| 2018/0281859 A1* | 10/2018 | Derendarz | G05D 1/0285 |
| 2019/0084618 A1* | 3/2019 | Numata | B62D 15/0275 |
| 2019/0146516 A1* | 5/2019 | Eshima | G08G 1/143 |
| | | | 701/23 |
| 2019/0180621 A1* | 6/2019 | Matsuda | B60R 21/00 |
| 2019/0351900 A1* | 11/2019 | Matsuda | B62D 15/0285 |
| 2020/0226926 A1* | 7/2020 | Suzuki | B60W 30/06 |

* cited by examiner

| EXIT DIRECTION | EVALUATION VALUE |
|---|---|
| TWO DIRECTIONS | 5 |
| FORWARD DIRECTION | 4 |
| REVERSE DIRECTION | 0 |

FIG. 10

| ROAD SURFACE CONDITION | EVALUATION VALUE |
|---|---|
| DRY | 5 |
| WET | 4 |
| COMPACTED SNOW | 3 |
| NON-COMPACTED SNOW | 1 |
| FROZEN | 0 |

FIG. 11

| INCLINATION IN EXIT DIRECTION | EVALUATION VALUE |
|---|---|
| FLAT | 5 |
| DOWNHILL | 3 |
| UPHILL | 0 |

DRIVING ASSISTANCE DEVICE FOR VEHICLE

CROSS-REFERENCE TO RELATED APPLICATIONS

The present application claims priority from Japanese Patent Application No. 2021-107501 filed on Jun. 29, 2021, the entire contents of which are hereby incorporated by reference.

BACKGROUND

The disclosure relates to a driving assistance device having a parking assistance control function for a vehicle in a parking lot.

In the field of vehicles such as automobiles, driving assistance devices that assist driving operations of drivers have been put into practical use to reduce loads on the driving operations of the drivers and improve safety. In this type of driving assistance device, various technologies have been developed for a driving assistance mode in which steering assistance control and acceleration/deceleration control are performed under the precondition that the driver voluntarily performs the driving operation, and a driving assistance mode in which the vehicle travels without the driving operation of the driver (so-called autonomous driving mode).

The driving assistance control in each driving assistance mode is basically achieved by an adaptive cruise control (ACC) function and an active lane keep centering (ALKC) function. With this driving assistance control, the vehicle can automatically travel along a traveling lane while keeping a distance from a preceding vehicle.

In this type of driving assistance device, there are many technologies for applying the driving assistance control to parking assistance control in parking lots. Examples of the technologies related to the parking assistance control include a technology disclosed in Japanese Unexamined Patent Application Publication (JP-A) No. 2018-149983. In this technology, an area having a possibility of either one of a puddle and snow is presumed for each parking space in a parking lot, and a vehicle is stopped while staying out of the area.

SUMMARY

An aspect of the disclosure provides a driving assistance device for a vehicle. The driving assistance device includes a traveling environment recognizer, a parking space detector, an evaluation value calculator, and a parking space setter. The traveling environment recognizer is configured to recognize traveling environment information related to an outside of the vehicle. The parking space detector is configured to, in a case where the vehicle has entered a parking lot, detect one or more parking spaces available to the vehicle based on the traveling environment information. The evaluation value calculator is configured to calculate one or more evaluation values for the one or more parking spaces, each of the one or more evaluation values including an exit hindrance factor as an evaluation item. The parking space setter is configured to select, with priority, a parking space for parking the vehicle from among the one or more parking spaces. An evaluation value of the parking space included in the one or more evaluation values is relatively high.

An aspect of the disclosure provides a driving assistance device for a vehicle. The driving assistance device includes circuitry. The circuitry is configured to recognize traveling environment information related to an outside of the vehicle. The circuitry is configured to, in a case where the vehicle has entered a parking lot, detect one or more parking spaces available to the vehicle based on the traveling environment information. The circuitry is configured to calculate one or more evaluation values for the one or more parking spaces, each of the one or more evaluation values including an exit hindrance factor as an evaluation item. The circuitry is configured to select, with priority, a parking space for parking the vehicle from among the one or more parking spaces. An evaluation value of the parking space included in the one or more evaluation values is relatively high.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

FIG. 10 illustrates a map showing evaluation values for road surface conditions in parking spaces;

FIG. 11 illustrates a map showing evaluation values for exit directions in the parking spaces;

DETAILED DESCRIPTION

In the technology of JP-A No. 2018-149983, an optimum parking space is not set but an optimum parking area is set in a parking space. The technology of JP-A No. 2018-149983 has room for improvement in the setting of an optimum parking space when a plurality of parking spaces are available to a target vehicle in a parking lot.

It is desirable to provide a driving assistance device that can select an optimum parking space for a target vehicle from among parking spaces in a parking lot.

Figure 1:
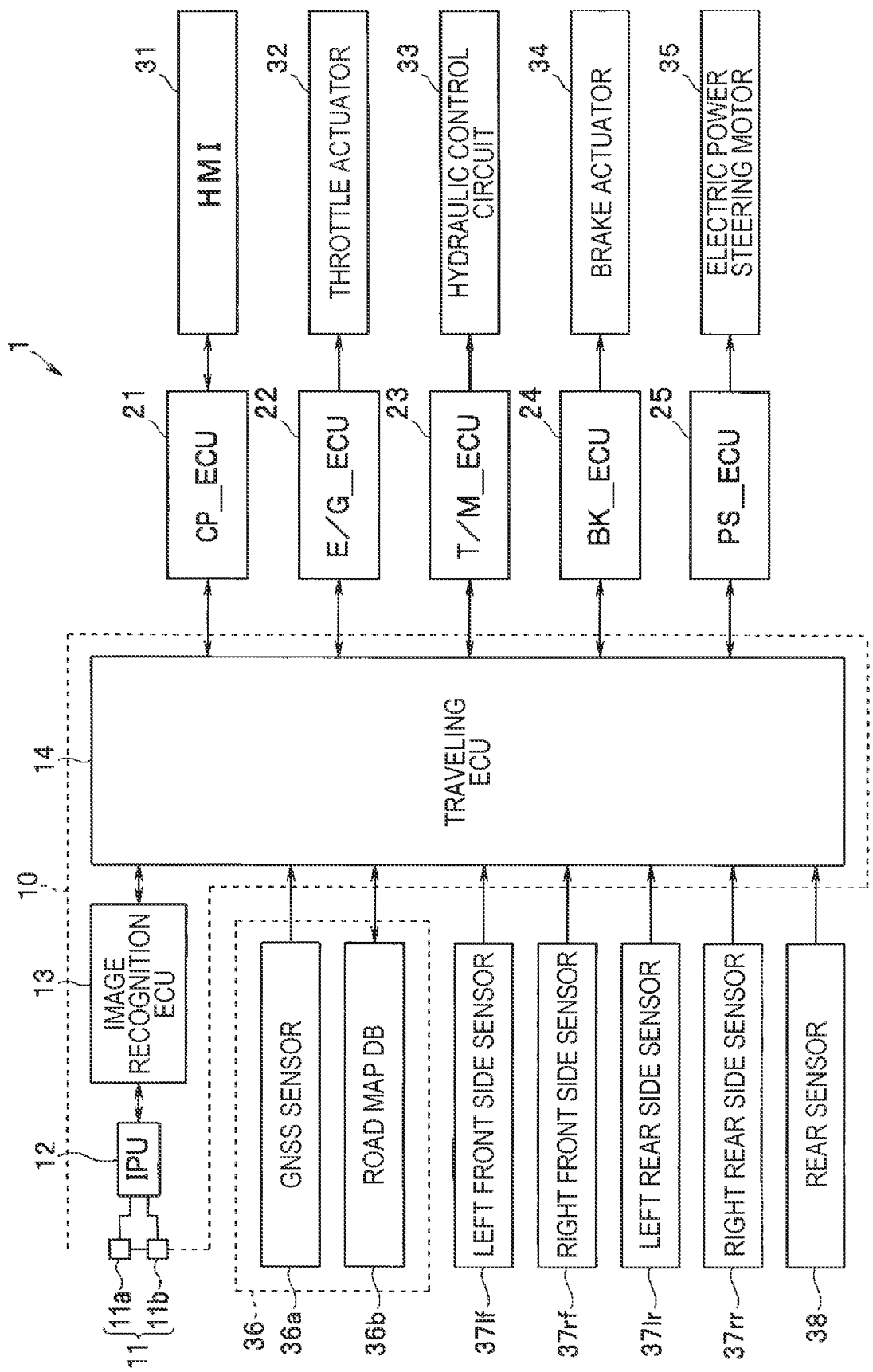
FIG. 1 is an overall configuration diagram of a driving assistance device.

An embodiment of the disclosure is described with reference to the drawings. The drawings are related to one embodiment of the disclosure. FIG. 1 is an overall configuration diagram of a driving assistance device.

As illustrated in FIG. 1, a driving assistance device 1 includes, for example, a camera unit 10 fixed to an upper central part of a front area in a cabin of a vehicle (target vehicle) M.

The camera unit 10 includes a stereo camera 11, an image processing unit (IPU) 12, an image recognition unit (image recognition ECU) 13, and a traveling control unit (traveling ECU) 14.

The stereo camera 11 includes a main camera 11a and a subcamera 11b. For example, the main camera 11a and the subcamera 11b are bilaterally symmetrical across the center in a vehicle width direction. For example, the main camera 11a and the subcamera 11b each include a CMOS, and perform stereoscopic imaging for a traveling environment in an external forward area Af (see FIG. 2) from different viewpoints in every predetermined synchronous imaging period.

The IPU 12 performs predetermined image processing for traveling environment images captured by the stereo camera 11 to detect various target edges of, for example, three-dimensional objects and lane lines on a road surface in the images. The IPU 12 obtains distance information from positional deviation amounts of corresponding edges in the right and left images, and generates image information including the distance information (distance image information).

The image recognition ECU 13 obtains, based on the distance image information received from the IPU 12, a road curvature [1/m] between right and left lane lines of a road where the target vehicle M is traveling (target vehicle traveling road) and a width between the right and left lane lines (lane width). Various methods are known to obtain the road curvature and the lane width. For example, the image recognition ECU 13 obtains the road curvature in such a manner that right and left lane lines are recognized by binarization using a difference in brightness levels based on traveling environment information and the curvatures of the right and left lane lines are obtained for each predetermined section by using a curve approximation expression based on the least-square method. The image recognition ECU 13 calculates the lane width from a difference in the curvatures of the right and left lane lines.

The image recognition ECU 13 calculates, based on the curvatures of the right and left lane lines and the lane width, a lane center and a target-vehicle lateral positional deviation that is a distance from the lane center to the center of the target vehicle M in the vehicle width direction.

The image recognition ECU 13 performs predetermined pattern matching for the distance image information to recognize three-dimensional objects such as guardrails along the road, curbstones, and surrounding vehicles. In the recognition of three-dimensional objects, the image recognition ECU 13 recognizes, for example, types of the three-dimensional objects, distances from the three-dimensional objects, speeds of the three-dimensional objects, and relative speeds between the three-dimensional objects and the target vehicle M.

Various types of information recognized by the image recognition ECU 13 are output to the traveling ECU 14 as traveling environment information.

The image recognition ECU 13 recognizes traveling environment information related to the outside of the vehicle in cooperation with the stereo camera 11 and the IPU 12. In one embodiment, the image recognition ECU 13 may serve as a "traveling environment recognizer".

The traveling ECU 14 is a control unit that centrally controls the driving assistance device 1.

Various control units such as a cockpit control unit (CP_ECU) 21, an engine control unit (E/G_ECU) 22, a transmission control unit (T/M_ECU) 23, a brake control unit (BK_ECU) 24, and a power steering control unit (PS_ECU) 25 are coupled to the traveling ECU 14 via an internal communication network such as a controller area network (CAN).

Various sensors such as a locator unit 36, a right front side sensor 37rf, a left front side sensor 37lf, a right rear side sensor 37rr, a left rear side sensor 37lr, and a rear sensor 38 are coupled to the traveling ECU 14.

A human-machine interface (HMI) 31 disposed near a driver's seat is coupled to the CP_ECU 21. For example, the HMI 31 includes a switch for giving instructions to execute various types of driving assistance control, a mode selection switch for switching driving assistance modes, a steering touch sensor that detects a steering wheel holding state of a driver, a driver monitoring system (DMS) that performs facial authentication of the driver and detects a line of sight, a touch panel display, a combination of meters, and a loudspeaker.

In response to a control signal from the traveling ECU 14, the CP_ECU 21 notifies the driver as appropriate by display and sound through the HMI 31 about various types of information related to, for example, various alerts for a preceding vehicle, the status of the driving assistance control, and the traveling environment of the target vehicle M. The CP_ECU 21 outputs, to the traveling ECU 14, various types of information input by the driver through the HMI 31, such as ON/OFF operations on various types of driving assistance control.

For example, a throttle actuator 32 of an electronically controlled throttle is coupled to an output side of the E/G_ECU 22. Various sensors such as an accelerator sensor (not illustrated) are coupled to an input side of the E/G_ECU 22.

The E/G_ECU 22 controls drive of the throttle actuator 32 based on, for example, either one of a control signal from the traveling ECU 14 and detection signals from various sensors. Thus, the E/G_ECU 22 adjusts the intake amount of an engine to generate desired engine power. The E/G_ECU 22 outputs, to the traveling ECU 14, signals of an accelerator operation amount and the like detected by various sensors.

A hydraulic control circuit 33 is coupled to an output side of the T/M_ECU 23. Various sensors such as a shift position sensor (not illustrated) are coupled to an input side of the T/M_ECU 23. The T/M_ECU 23 performs hydraulic control for the hydraulic control circuit 33 based on, for example, a signal of an engine torque estimated by the E/G_ECU 22 and detection signals from various sensors. Thus, the T/M_ECU 23 changes the engine power at a desired speed ratio by operating, for example, friction engagement elements and pulleys in an automatic transmission. The T/M_ECU 23 outputs, to the traveling ECU 14, signals of a shift position and the like detected by various sensors.

A brake actuator for adjusting brake fluid pressures to be output to brake wheel cylinders in individual wheels is coupled to an output side of the BK_ECU 24. Various sensors such as a brake pedal sensor, a yaw rate sensor, a longitudinal acceleration sensor, and a vehicle speed sensor (not illustrated) are coupled to an input side of the BK_ECU 24.

The BK_ECU 24 controls drive of the brake actuator based on either one of a control signal from the traveling ECU 14 and detection signals from various sensors. Thus, the BK_ECU 24 generates, for the wheels as appropriate, braking forces for forcible braking control and yaw rate control on the target vehicle M. The BK_ECU 24 outputs, to the traveling ECU 14, signals of a brake operation status, a yaw rate, a longitudinal acceleration, a vehicle speed (target vehicle speed), and the like detected by various sensors.

An electric power steering motor 35 for applying a steering torque of a rotational force from a motor to a steering mechanism is coupled to an output side of the PS_ECU 25. Various sensors such as a steering torque sensor and a steering angle sensor are coupled to an input side of the PS_ECU 25.

The PS_ECU 25 controls drive of the electric power steering motor 35 based on either one of a control signal from the traveling ECU 14 and detection signals from various sensors. Thus, the PS_ECU 25 generates the steering torque for the steering mechanism. The PS_ECU 25 outputs, to the traveling ECU 14, signals of a steering torque, a steering angle, and the like detected by various sensors.

The locator unit 36 includes a GNSS sensor 36a and a high-accuracy road map database (road map DB) 36b.

The GNSS sensor 36a measures the position (latitude, longitude, and altitude) of the target vehicle M by receiving positioning signals from a plurality of positioning satellites.

The road map DB 36b is a large-capacity storage medium such as an HDD, and stores high-accuracy road map information (dynamic map). For example, the road map DB 36b stores lane width data, lane center position coordinate data, lane azimuth angle data, and speed limits as lane data for use in autonomous driving. The stored lane data includes pieces of data for several-meter intervals in each lane on the road map. The road map DB stores information on various facilities and parking lots. Based on, for example, a request signal from the traveling ECU 14, the road map DB 36b outputs road map information in a set range around the target vehicle position measured by the GNSS sensor 36a to the traveling ECU 14 as traveling environment information.

The road map DB 36b recognizes traveling environment information related to the outside of the vehicle in cooperation with the GNSS sensor 36a. In one embodiment, the road map DB 36b may serve as a "traveling environment recognizer".

Examples of the right front side sensor 37rf and the left front side sensor 371f include millimeter wave radars. For example, the right front side sensor 37rf and the left front side sensor 371f are disposed on right and left sides of a front bumper. The right front side sensor 37rf and the left front side sensor 371f detect, as traveling environment information, three-dimensional objects in right and left obliquely forward and side areas Arf and Alf around the target vehicle M (see FIG. 2). Those areas are difficult to recognize from an image captured by the stereo camera 11.

Examples of the right rear side sensor 37rr and the left rear side sensor 371r include millimeter wave radars. For example, the right rear side sensor 37rr and the left rear side sensor 371r are disposed on right and left sides of a rear bumper. The right rear side sensor 37rr and the left rear side sensor 371r detect, as traveling environment information, three-dimensional objects in right and left obliquely rearward and side areas Arr and Alr around the target vehicle M (see FIG. 2). Those areas are difficult to recognize by the right front side sensor 37rf and the left front side sensor 371f.

Each millimeter wave radar detects the three-dimensional object such as a vehicle traveling side by side by outputting a radio wave and analyzing the reflected wave from the object. For example, each radar detects a width of the three-dimensional object, a position of a representative point of the three-dimensional object (position relative to the target vehicle M), and a speed of the three-dimensional object as information related to the three-dimensional object.

The right front side sensor 37rf, the left front side sensor 371f, the right rear side sensor 37rr, and the left rear side sensor 371r recognize traveling environment information related to the outside of the vehicle. In one embodiment, the right front side sensor 37rf, the left front side sensor 371f, the right rear side sensor 37rr, and the left rear side sensor 371r may serve as a "traveling environment recognizer".

Examples of the rear sensor 38 include a sonar. For example, the rear sensor 38 is disposed on the rear bumper. The rear sensor 38 detects three-dimensional objects in a rearward area Ar behind the target vehicle M (see FIG. 2) as traveling environment information. This area is difficult to recognize by the right rear side sensor 37rr and the left rear side sensor 371r.

The rear sensor 38 recognizes traveling environment information related to the outside of the vehicle. In one embodiment, the rear sensor 38 may serve as a "traveling environment recognizer".

Figure 2:
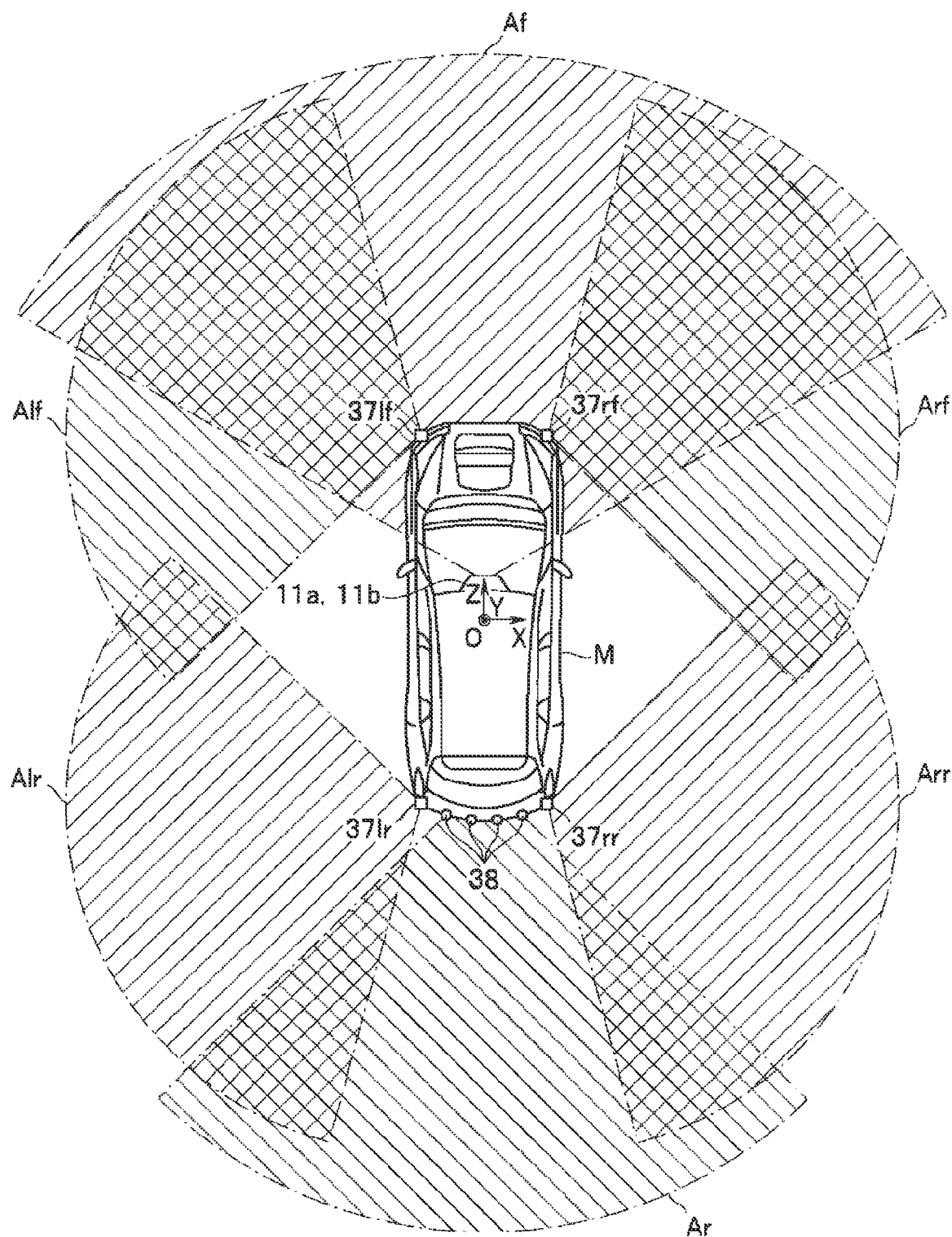
FIG. 2 illustrates monitoring areas of a stereo camera, a radar, and a sonar.

Coordinates of the external targets in the traveling environment information recognized by the image recognition ECU 13, the traveling environment information recognized by the locator unit 36, the traveling environment information recognized by the right front side sensor 37rf, the traveling environment information recognized by the left front side sensor 371f, the traveling environment information recognized by the right rear side sensor 37rr, the traveling environment information recognized by the left rear side sensor 371f, and the traveling environment information recognized by the rear sensor 38 are converted by the traveling ECU 14 into coordinates in a three-dimensional coordinate system having its origin at the center of the target vehicle M (see FIG. 2).

The traveling ECU 14 has driving modes such as a manual driving mode, a first traveling control mode, a second traveling control mode, and a limp home mode. The traveling ECU 14 can selectively switch the driving modes based on, for example, a status of operation on the mode selection switch of the HMI 31.

The manual driving mode is a driving mode in which the driver is assumed to hold the steering wheel. In this driving mode, the target vehicle M travels by driving operations of the driver, such as a steering operation, an accelerator operation, and a brake operation.

The first traveling control mode is also a driving mode in which the driver is assumed to hold the steering wheel. That is, the first traveling control mode is a so-called semi-autonomous driving mode in which the target vehicle M travels along a target traveling route by combining, for example, adaptive cruise control (ACC), active lane keep centering (ALKC) control, and active lane keep bouncing control as appropriate through control of, for example, the E/G_ECU 22, the BK_ECU 24, and the PS_ECU 25 while reflecting the driving operations of the driver.

The adaptive cruise control is basically performed based on traveling environment information input from the image recognition ECU 13. For example, the adaptive cruise control is performed based on preceding vehicle information in the traveling environment information from the image recognition ECU 13.

The active lane keep centering control and the active lane keep bouncing control are basically performed based on traveling environment information input from at least one of the image recognition ECU 13 or the locator unit 36. For example, the active lane keep centering control and the active lane keep bouncing control are performed based on lane line information in the traveling environment information from either one of the image recognition ECU 13 and the locator unit 36.

The second traveling control mode is an autonomous driving mode in which the target vehicle M travels along a target route (route map information) by combining, for example, the adaptive cruise control, the active lane keep centering control, and the active lane keep bouncing control as appropriate through control of, for example, the E/G_ECU 22, the BK_ECU 24, and the PS_ECU 25 without the steering wheel holding by the driver, the accelerator operation, and the brake operation.

In the limp home mode, the target vehicle M is automatically stopped, for example, at a side strip when the target vehicle M traveling in the second traveling control mode cannot continue the traveling in this mode and the driver cannot take over the driving operation (that is, the mode cannot be switched to either one of the manual driving mode and the first traveling control mode).

In each of the driving modes described above, the traveling ECU 14 performs autonomous emergency brake (AEB: collision damage reduction brake) control as appropriate against an obstacle such as a vehicle having a strong possibility of colliding with the target vehicle M.

When determination is made that there is difficulty in avoiding collision with the obstacle by the emergency brake control, the traveling ECU 14 may perform emergency steering control for avoiding the collision with the obstacle in place of or in combination with the emergency brake control.

The emergency brake control and the emergency steering control are basically performed based on traveling environment information input from the image recognition ECU 13. For example, the emergency brake control and the emergency steering control are performed based on information on an obstacle such as a preceding vehicle or a stopped vehicle in the traveling environment information from the image recognition ECU 13. To avoid collision with, for example, either one of a vehicle traveling side by side and a succeeding vehicle, reference is made to information on the succeeding vehicle and information on the vehicle traveling side by side in the pieces of traveling environment information from the right and left front side sensors 37r*f* and 37l*f*, the right and left rear side sensors 37r*r* and 37l*r*, and the rear sensor 38.

The traveling ECU 14 performs parking control when the target vehicle M has entered a parking lot.

In the parking control, the traveling ECU 14 first sets an optimum parking space available to the target vehicle M.

When setting the parking space, the traveling ECU 14 first searches for parking spaces available to the target vehicle M. For example, the traveling ECU 14 searches for parking spaces in a preset search area Sa ahead of the target vehicle M based on pieces of traveling environment information input from the image recognition ECU 13 and the right and left front side sensors 37r*f* and 37l*f*. For example, as illustrated in FIGS. 3 and 4, the search area Sa moves along with traveling of the target vehicle M.

For example, the traveling ECU 14 searches for the parking spaces in the search area Sa based on partition line information on a road surface in the traveling environment information from the image recognition ECU 13. When the parking spaces are detected, the traveling ECU 14 checks whether a parked vehicle is present in the detected parking spaces based on, for example, three-dimensional object information in the pieces of traveling environment information from the image recognition ECU 13 and the right and left front side sensors 37r*f* and 37l*f*. The traveling ECU 14 extracts a parking space with no parked vehicle as the parking space available to the target vehicle M.

Figure 3:
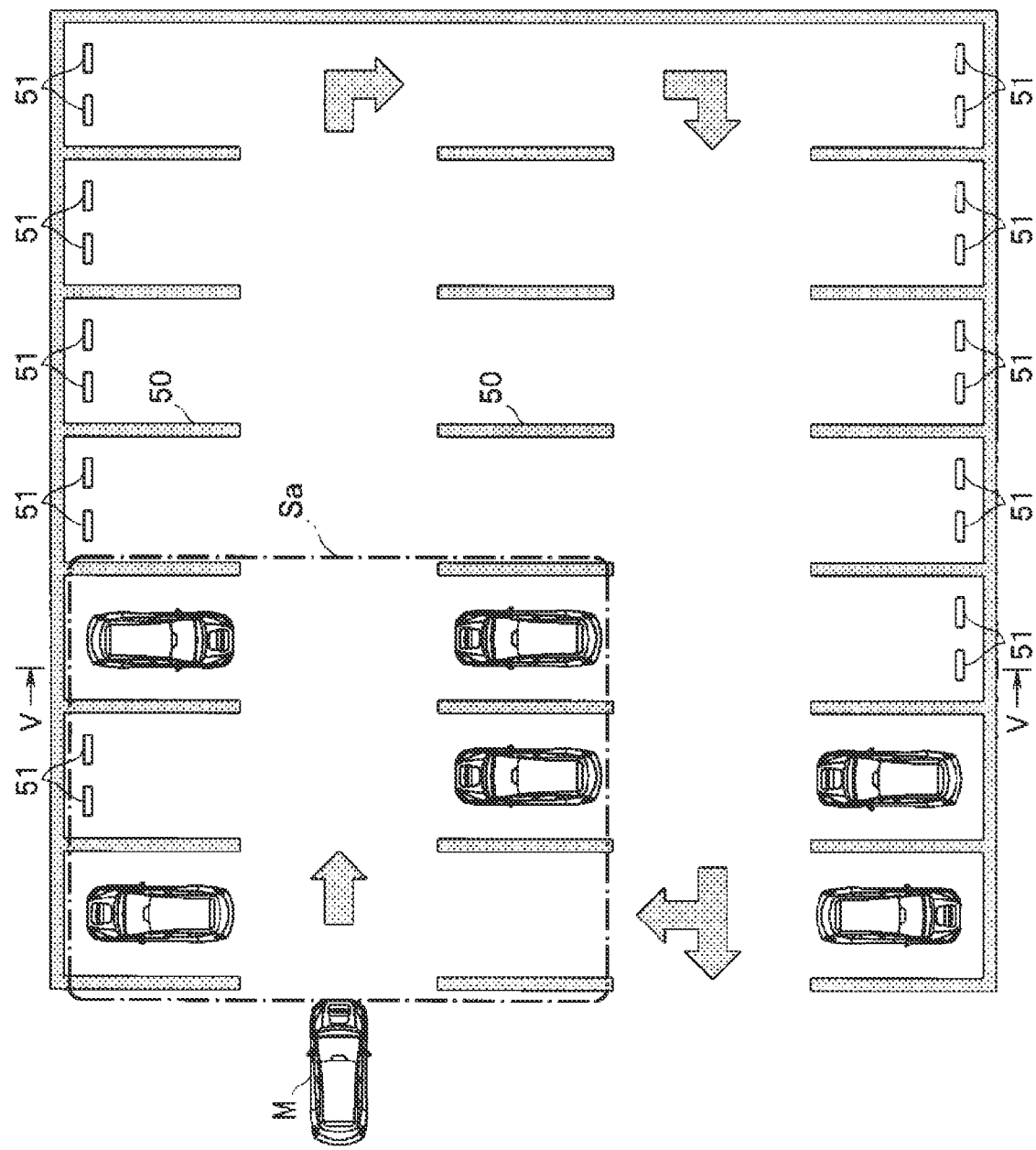
FIG. 3 illustrates a parking lot.
Figure 4:
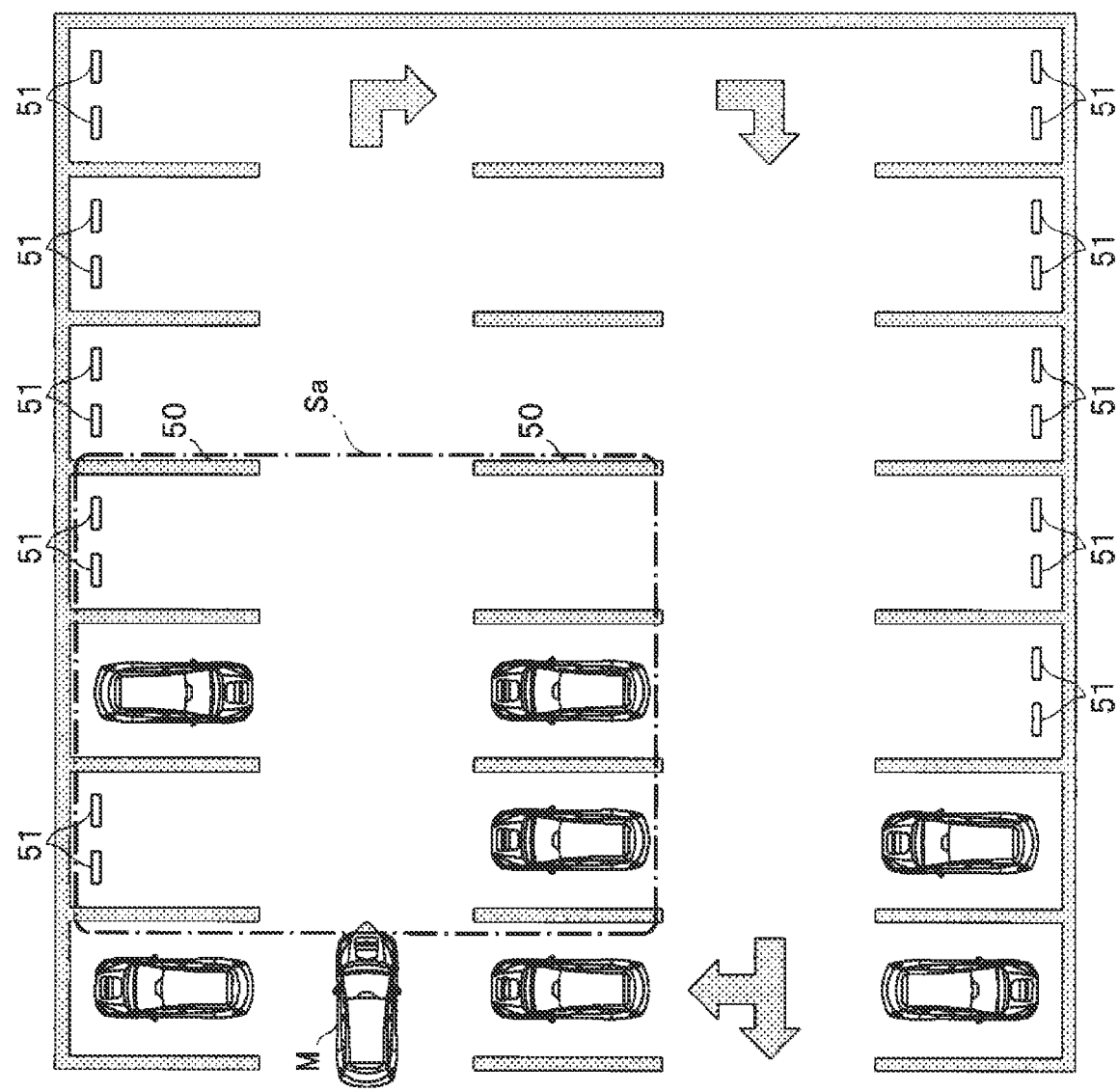
FIG. 4 illustrates the parking lot.
Figures 5, 6:
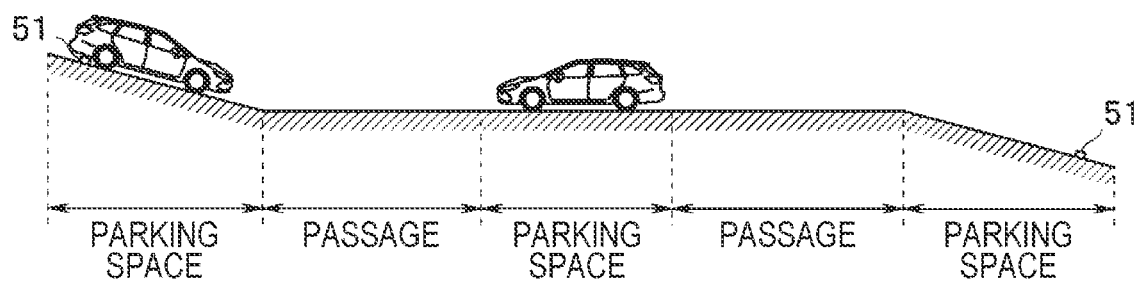
FIG. 5 illustrates inclinations in the parking lot along the line V-V in FIG. 3.
FIG. 6 illustrates a map showing evaluation values for exit directions of a target vehicle.
Figure 7:
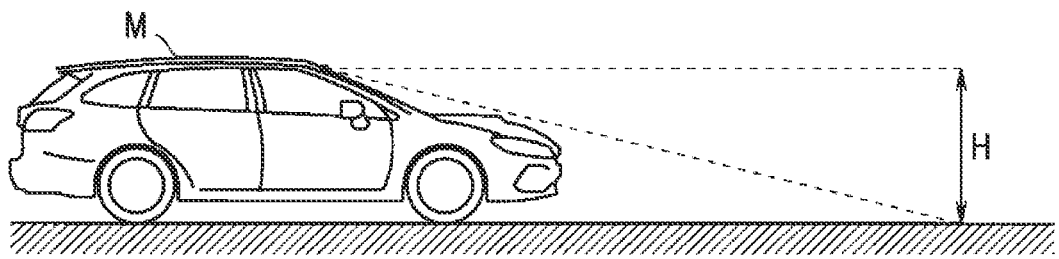
FIG. 7 illustrates a height from a road surface without snow to a camera mounting position.

Based on, for example, the traveling environment information from the image recognition ECU 13, the traveling ECU 14 recognizes an inclination (road surface gradient) of the parking space available to the target vehicle M, and recognizes whether the parking space available to the target vehicle M has a wheel stopper (see FIG. 3 to FIG. 5).

Based on, for example, the traveling environment information from the image recognition ECU 13, the traveling ECU 14 determines an optimum entry direction to the parking space available to the target vehicle M, and determines a possible exit direction in a case where the target vehicle M is parked in the optimum entry direction. For example, when the parking space faces passages at both longitudinal ends and has no wheel stopper, the traveling ECU 14 basically determines that forward entry to the parking space is appropriate. In this parking space, the traveling ECU 14 determines that the target vehicle M can exit in two forward and reverse directions.

When the parking space has a wheel stopper, the traveling ECU 14 basically determines that reverse entry to the parking space is appropriate. In this parking space, the traveling ECU 14 determines that forward exit is possible.

The traveling ECU 14 determines that forward entry is appropriate to the parking space having a wheel stopper, for example, when determination is made that it is difficult to park the target vehicle M by reverse entry unless K-turn is attempted three times or more, or when a sign indicating forward entry is recognized in the traveling environment information. In this parking space, the traveling ECU 14 determines that reverse exit is possible.

The pieces of information on the inclination of the road surface of the parking space, the presence or absence of a wheel stopper, the appropriate entry direction, and the possible exit direction are stored in the traveling ECU 14 as auxiliary information for each parking space available to the target vehicle M.

Subsequently, the traveling ECU 14 calculates an evaluation value Ev for the parking space available to the target vehicle M. The evaluation value Ev includes evaluation of an exit hindrance factor as an evaluation item. The calculated evaluation value Ev increases as the hindrance factor decreases.

For example, the traveling ECU 14 evaluates an exit direction from the parking space as the evaluation related to the exit hindrance factor. For example, the traveling ECU 14 calculates an evaluation value Ev1 by referring to a preset map (see, for example, FIG. 6) depending on whether the possible exit direction from the parking space is two forward and reverse directions, a forward direction, or a reverse direction. For example, the evaluation value Ev1 is highest for a parking space where exit in the two forward and reverse directions is possible, second highest for a parking space where forward exit is possible, and third highest for a parking space where reverse exit is possible.

For example, the traveling ECU 14 evaluates a road surface condition in the parking space as the evaluation related to the exit hindrance factor. The road surface condition in the parking space is evaluated at least based on whether snow is present. For example, the traveling ECU 14 calculates an evaluation value Ev2 by referring to a preset map (see, for example, FIG. 10) depending on whether the road surface of the parking space is dry, is wet, has compacted snow, has non-compacted snow, or is frozen. The evaluation value Ev2 increases under the road surface condition that the wheels are not slippery when exiting the parking space. For example, the evaluation value Ev2 is highest for a parking space having a dry road surface, second highest for a parking space having a wet road surface, third highest for a parking space having a road surface with compacted snow, fourth highest for a parking space having a road surface with non-compacted snow, and fifth highest for a parking space having a frozen road surface.

For example, the road surface condition in the parking space is estimated based on a road surface condition of a passage to the parking space. For example, the traveling ECU 14 determines whether the road surface of the passage is dry, wet, or snowy based on a brightness level of an image of the passage that is captured by the stereo camera 11. When determination is made that the road surface is wet, the traveling ECU 14 refers to an outside air temperature, and determines that the road surface (wet road surface) is frozen when the outside air temperature is equal to or lower than a set temperature (for example, 0° C.)

Figure 8:
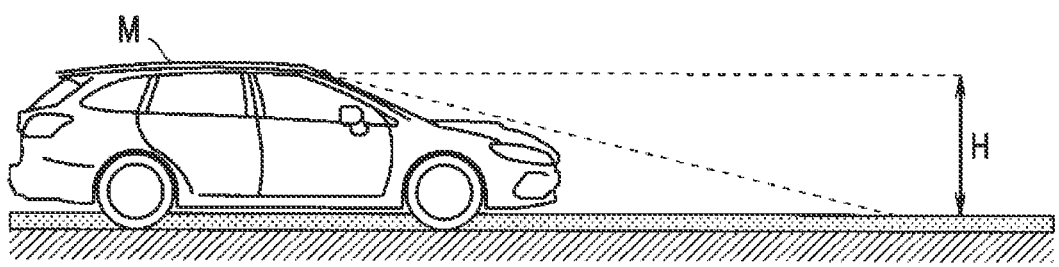
FIG. 8 illustrates a height from a road surface with non-compacted snow to the camera mounting position.
Figure 9:
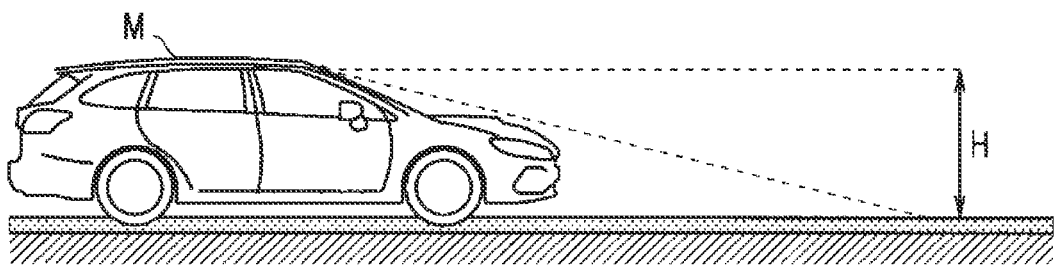
FIG. 9 illustrates a height from a road surface with compacted snow to the camera mounting position.

When determination is made that the road surface is snowy, the traveling ECU 14 determines whether the road surface has compacted snow or non-compacted snow based on, for example, a height H from the road surface to the stereo camera 11. For example, the body of the target vehicle M traveling along the snowy road surface sinks into the snow (see FIGS. 8 and 9). Therefore, the height H from the road surface to the stereo camera 11 is smaller than in a case where the target vehicle M travels along a road surface without snow. In a case where the target vehicle M is traveling along the road surface with non-compacted snow, the sinking amount of the vehicle body generally increases. Therefore, the height H from the road surface to the stereo camera 11 is smaller than in a case where the target vehicle M travels along the road surface with compacted snow. For example, when the target vehicle M is traveling along the snowy road surface, the traveling ECU 14 determines that the target vehicle M is traveling along the road surface with compacted snow in a case where the height H is equal to or larger than a preset threshold, and determines that the target vehicle M is traveling along the road surface with non-compacted snow in a case where the height H is smaller than the threshold.

For example, the traveling ECU 14 may cause the BK_ECU 24 to estimate a coefficient of friction of the road surface by causing the target vehicle M to travel in the parking lot by a predetermined distance or longer, and increase the evaluation value Ev2 related to the road surface condition as the coefficient of friction of the road surface increases.

The traveling ECU 14 evaluates an inclination of the parking space in the exit direction as the evaluation related to the exit hindrance factor. That is, the traveling ECU 14 calculates an evaluation value Ev3 by referring to a preset map (see, for example, FIG. 11) depending on whether the inclination of the road surface of the parking space is flat, downhill in the exit direction, or uphill in the exit direction. For example, the evaluation value Ev3 is highest when there is no inclination in the exit direction (the road surface of the parking space is flat), second highest when the inclination is downhill in the exit direction, and third highest when the inclination is uphill in the exit direction. The flat road surface of the parking space with no gradient is not limited to a strictly level road surface. For example, the road surface is flat when the inclination angle of the parking space is smaller than ±5°. A parking space where the exit direction is two forward and reverse directions and the road surface has a gradient is evaluated as, for example, a parking space that is downhill in the exit direction. The evaluation value Ev3 to be calculated for the parking space having the gradient in the exit direction may be a specific value depending on the inclination angle.

The traveling ECU 14 calculates a comprehensive evaluation value Ev for each parking space based on the evaluation values Ev1 to Ev3 set for the exit hindrance factors. For example, the traveling ECU 14 can calculate the evaluation value Ev by weighted averaging of the evaluation values Ev1 to Ev3 for the exit hindrance factors. Either one of another hindrance factor and an evaluation item other than the hindrance factor may additionally be used to calculate the evaluation value Ev.

Subsequently, the traveling ECU 14 selects, with priority, a parking space where the evaluation value Ev is relatively high as the parking space for the target vehicle M from among the detected parking spaces.

For example, the traveling ECU 14 extracts parking spaces where the evaluation value Ev is equal to or higher than a preset threshold Evth, and selects, with priority, a parking space where the evaluation value Ev is highest as the parking space for the target vehicle M from among the extracted parking spaces.

When the parking space where the evaluation value Ev is equal to or higher than the threshold Evth has not been detected yet, for example, the traveling ECU 14 continues to search for new parking spaces along with traveling of the target vehicle M instead of setting the parking space. For example, the search for the parking spaces is performed until the target vehicle M finishes searching the entire parking lot or until the parking space where the evaluation value Ev is equal to or higher than the threshold Evth is detected.

In one embodiment, the traveling ECU 14 may serve as a "parking space detector", an "evaluation value calculator", and a "parking space setter".

When the parking space is set, the traveling ECU 14 performs the parking control for the set parking space.

Figure 12:
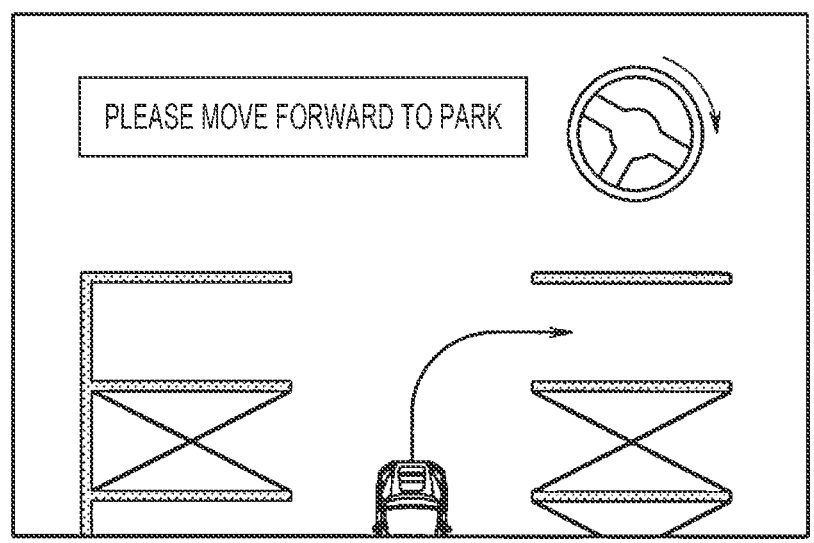
FIG. 12 illustrates an assist screen during forward parking.
Figure 13:
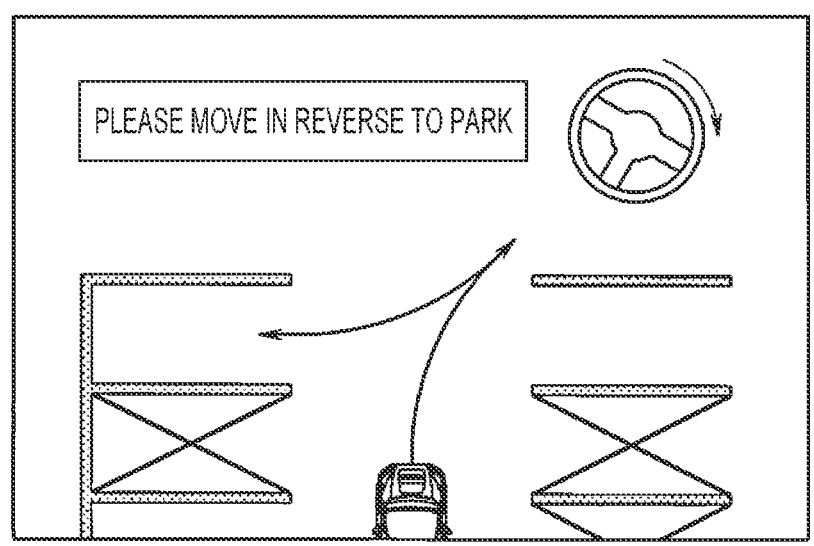
FIG. 13 illustrates an assist screen during reverse parking.

That is, the traveling ECU 14 sets a traveling trajectory of the target vehicle M to the set parking space based on auxiliary information of the set parking space (that is, whether the parking space is appropriate to forward parking or reverse parking). When the current driving mode is either one of the manual driving mode and the first traveling control mode, the traveling ECU 14 displays the traveling trajectory to the parking space through the HMI 31 or the like (see FIGS. 12 and 13). When the current driving mode is the second traveling control mode, the traveling ECU 14 parks the target vehicle M in the parking space through the steering control or the like based on the set traveling trajectory.

Figure 14:
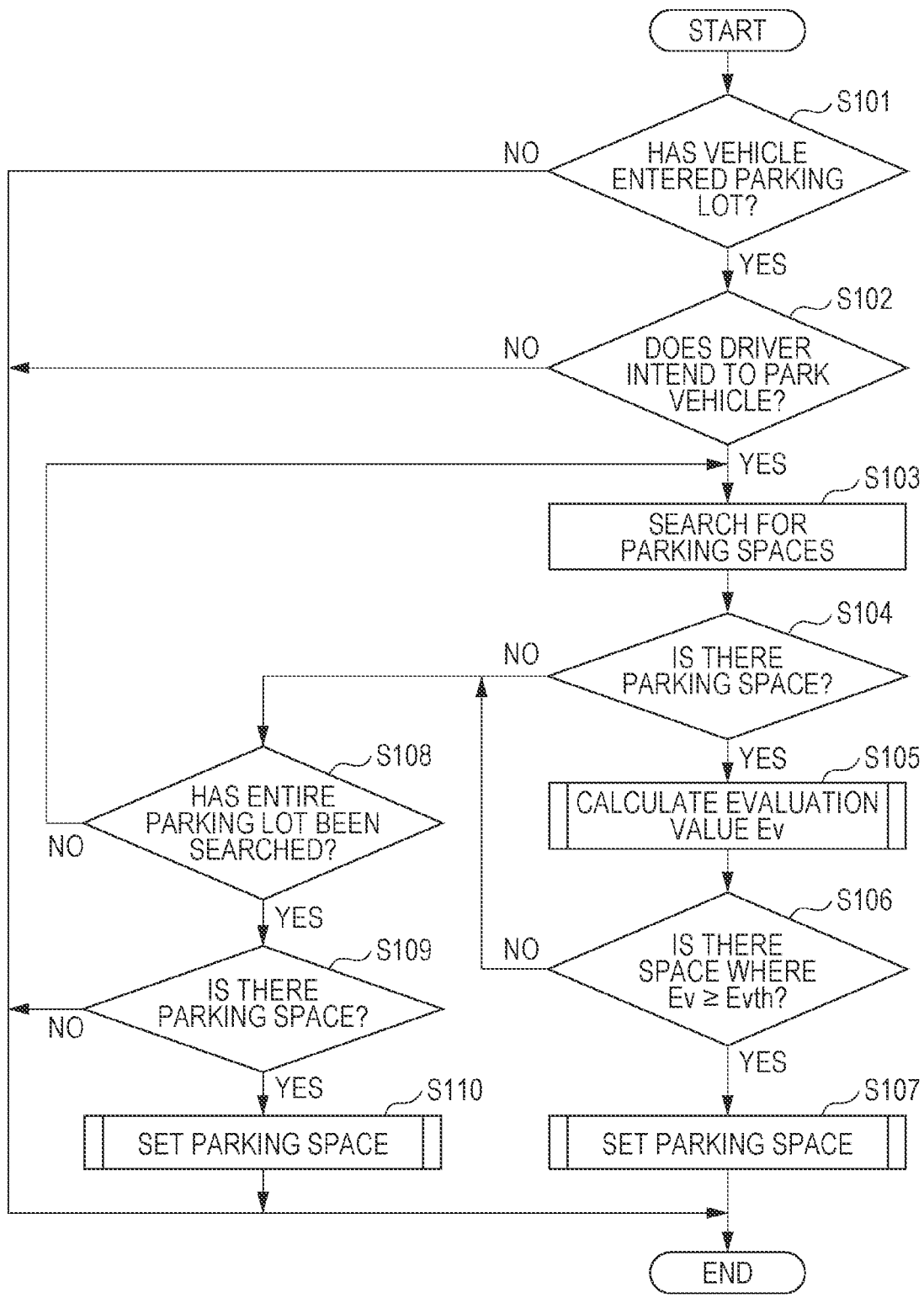
FIG. 14 is a flowchart illustrating a parking space setting routine.

Next, the parking space setting to be executed by the traveling ECU 14 is described with reference to a flowchart of a parking space setting routine illustrated in FIG. 14. For example, this routine is an interrupt routine to be repeated at every set time while the target vehicle M is traveling.

When the routine is started, the traveling ECU 14 first checks in Step S101 whether the target vehicle M has entered a parking lot.

When determination is made in Step S101 that the target vehicle M has not entered the parking lot, the traveling ECU 14 terminates the routine.

Figure 15:
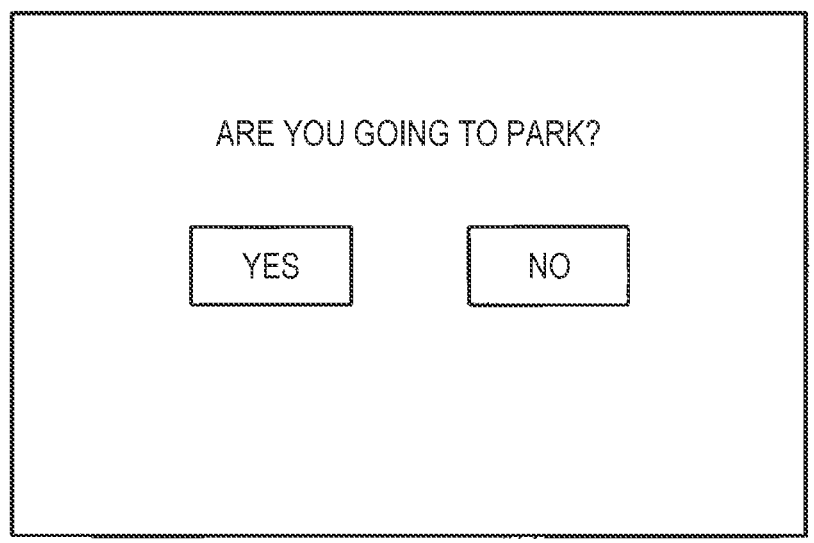
FIG. 15 illustrates a selection screen for parking intention.

When determination is made in Step S101 that the target vehicle M has entered the parking lot, the traveling ECU 14 proceeds to Step S102 to check whether the driver intends to park the target vehicle M in the parking lot. For example, the traveling ECU 14 determines that the driver has parking intention when a destination has been set by using a navigation device and the target vehicle M has entered a parking lot at the destination. For example, as illustrated in FIG. 15, the traveling ECU 14 may check the parking intention of the driver by display through the HMI 31.

When determination is made in Step S102 that the driver does not have parking intention, the traveling ECU 14 terminates the routine.

When determination is made in Step S102 that the driver has parking intention, the traveling ECU 14 proceeds to Step S103 to search for parking spaces available to the target vehicle M. In Step S103, for example, the traveling ECU 14 searches for parking spaces in the preset search area Sa ahead of the target vehicle M based on pieces of traveling environment information input from the image recognition ECU 13 and the right and left front side sensors 37*rf* and 371*f*.

In Step S104, the traveling ECU 14 checks whether one or more parking spaces available to the target vehicle M have been detected by the search in Step S103.

When determination is made in Step S104 that no parking space has been detected, the traveling ECU 14 proceeds to Step S108.

When determination is made in Step S104 that parking spaces have been detected, the traveling ECU 14 proceeds to Step S105 to calculate evaluation values Ev for the detected parking spaces.

In Step S105, the traveling ECU 14 calculates, for each parking space, the evaluation value Ev including the exit hindrance factor as the evaluation item.

In Step S106, the traveling ECU 14 compares the evaluation values Ev of the parking spaces with the preset threshold Evth to check whether a parking space where the evaluation value Ev is equal to or higher than the threshold Evth has been detected thus far.

When determination is made in Step S106 that the parking space where the evaluation value Ev is equal to or higher than the threshold Evth has not been detected, the traveling ECU 14 proceeds to Step S108.

When determination is made in Step S106 that the parking space where the evaluation value Ev is equal to or higher than the threshold Evth has been detected, the traveling ECU 14 proceeds to Step S107 to set a parking space based on the evaluation value Ev, and then terminates the routine.

In Step S107, the traveling ECU 14 basically sets a parking space where the evaluation value Ev is highest as the parking space for the target vehicle M.

When a plurality of parking spaces have the highest evaluation value Ev, the traveling ECU 14 may set, for example, a parking space closest to the target vehicle M as the parking space for the target vehicle M among the parking spaces where the evaluation value Ev is highest.

Figure 16:
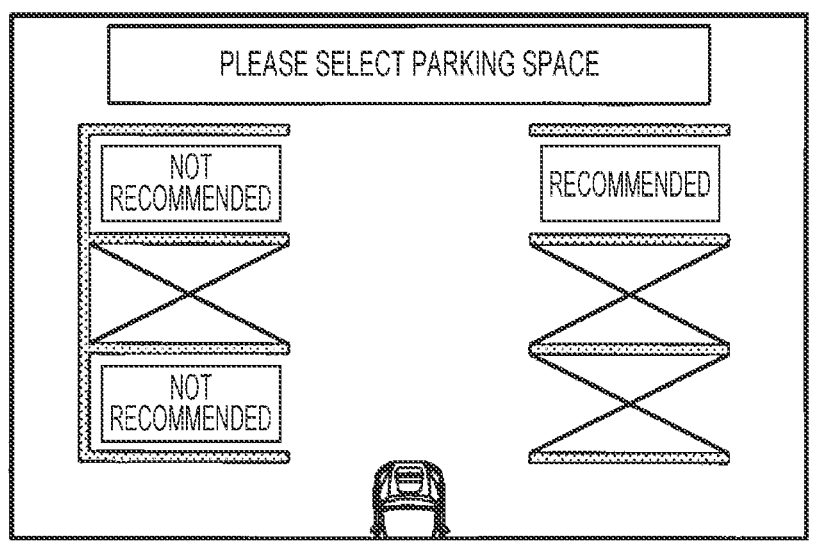
FIG. 16 illustrates a selection screen for parking spaces.

For example, as illustrated in FIG. 16, the traveling ECU 14 may prompt the driver to select the parking space for the target vehicle M by display through the HMI 31. In this case, it is desirable that the parking space where the evaluation value Ev is highest be displayed as a recommended parking space.

In Step S108 from either one of Step S104 and Step S106, the traveling ECU 14 checks whether the search for parking spaces in the entire parking lot has been completed.

When determination is made in Step S108 that the search for parking spaces in the entire parking lot has not been completed yet, the traveling ECU 14 returns to Step S103.

When determination is made in Step S108 that the search for parking spaces in the entire parking lot has been completed, the traveling ECU 14 proceeds to Step S109 to check whether parking spaces have been detected in the parking lot, that is, whether at least one parking space where the evaluation value Ev is lower than the threshold Evth has been detected.

When determination is made in Step S109 that no parking space has been detected, the traveling ECU 14 terminates the routine.

When determination is made in Step S109 that parking spaces have been detected, the traveling ECU 14 proceeds to Step S110 to set a parking space based on the evaluation value Ev, and then terminates the routine.

In Step S110, the traveling ECU 14 basically sets a parking space where the evaluation value Ev is highest as the parking space for the target vehicle M.

When a plurality of parking spaces have the highest evaluation value Ev, the traveling ECU 14 may set, for example, a parking space closest to the target vehicle M as the parking space for the target vehicle M among the parking spaces where the evaluation value Ev is highest.

For example, as illustrated in FIG. 16, the traveling ECU 14 may prompt the driver to select the parking space for the target vehicle M by display through the HMI 31. In this case, it is desirable that the parking space where the evaluation value Ev is highest be displayed as a recommended parking space.

According to the embodiment, when the target vehicle M has entered the parking lot, the traveling ECU 14 detects one or more parking spaces available to the target vehicle M based on the traveling environment information, calculates the evaluation values Ev including the exit hindrance factor as the evaluation item for the detected parking spaces, and selects, with priority, a parking space where the evaluation value Ev is relatively high as the parking space for the target vehicle M from among the detected parking spaces. Thus, an optimum parking space for the target vehicle M can be selected from among the parking spaces in the parking lot.

That is, the traveling ECU 14 sets the parking space in consideration of, for example, a wheel slip and poor visibility expected when exiting the parking space. Thus, the optimum parking space can be set in consideration of, for example, safety and a possibility of wheels being stuck when exiting the parking space.

In this case, the traveling ECU 14 evaluates the possible exit direction of the target vehicle M from the parking space, thereby setting an appropriate parking space in consideration of safety from the viewpoint of securing visibility when exiting the parking space.

The traveling ECU 14 evaluates the road surface condition in the parking space, thereby setting an appropriate parking space in consideration of safety from the viewpoint of suppressing a slip when exiting the parking space. In particular, the road surface condition is evaluated at least based on whether snow is present. Thus, determination can be made more appropriately about the suppression of a slip when exiting the parking space.

The traveling ECU 14 evaluates the inclination of the parking space, thereby setting an appropriate parking space in consideration of safety from the viewpoint of suppressing a slip when exiting the parking space.

In the embodiment described above, the IPU 12, the image recognition ECU 13, the traveling ECU 14, the CP_ECU 21, the E/G_ECU 22, the T/M_ECU 23, the BK_ECU 24, and the PS_ECU 25 are each implemented by a known microcomputer including a CPU, a RAM, a ROM, and a non-volatile storage and peripheral devices around the microcomputer. The ROM prestores programs to be executed by the CPU and fixed data such as data tables. All or a part of the functions of the processor may be implemented by a logic or analog circuit, and processes in various programs may be implemented by an electronic circuit such as an FPGA.

The embodiment of the disclosure is not limited to the embodiment described above, and various modifications may be made without departing from the gist in the implementation. The embodiment includes various aspects of the disclosure that may be extracted by any appropriate combination of a plurality of disclosed constituent elements.

For example, some of the constituent elements in the embodiment may be omitted as long as the problems described above can be solved and the effects described above can be attained.

The traveling ECU 14 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the traveling ECU 14. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A driving assistance device for a vehicle, the driving assistance device comprising:
    a traveling environment recognizer configured to recognize traveling environment information related to an outside of the vehicle;
    a parking space detector configured to, in a case where the vehicle has entered a parking lot, detect parking spaces available to the vehicle based on the traveling environment information;
    an evaluation value calculator configured to calculate an evaluation value for each of the parking spaces, the evaluation value reflecting an exit hindrance factor as an evaluation item; and
    a parking space setter configured to select, with priority, a parking space for parking the vehicle from among the parking spaces based on the evaluation value for each of the parking space,
    wherein the evaluation value of the parking space calculated by the evaluation value calculator is higher than the evaluation value for any remaining parking space.

2. The driving assistance device for the vehicle according to claim 1, wherein the evaluation value calculator is configured to evaluate a possible exit direction of the vehicle from each of the parking spaces as the exit hindrance factor.

3. The driving assistance device for the vehicle according to claim 1, wherein the evaluation value calculator is configured to evaluate a surface condition in each of the parking spaces as the exit hindrance factor.

4. The driving assistance device for the vehicle according to claim 2, wherein the evaluation value calculator is configured to evaluate a surface condition in each of the parking spaces as the exit hindrance factor.

5. The driving assistance device for the vehicle according to claim 3, wherein the evaluation value calculator is configured to evaluate the surface condition at least based on whether snow is present on a surface of each of the parking spaces.

6. The driving assistance device for the vehicle according to claim 4, wherein the evaluation value calculator is configured to evaluate the surface condition at least based on whether snow is present on a surface of each of the parking spaces.

7. The driving assistance device for the vehicle according to claim 1, wherein the evaluation value calculator is configured to evaluate an inclination of each of the parking spaces as the exit hindrance factor.

8. The driving assistance device for the vehicle according to claim 2, wherein the evaluation value calculator is configured to evaluate an inclination of each of the parking spaces as the exit hindrance factor.

9. The driving assistance device for the vehicle according to claim 3, wherein the evaluation value calculator is configured to evaluate an inclination of each of the parking spaces as the exit hindrance factor.

10. The driving assistance device for the vehicle according to claim 4, wherein the evaluation value calculator is configured to evaluate an inclination of each of the parking spaces as the exit hindrance factor.

11. The driving assistance device for the vehicle according to claim 5, wherein the evaluation value calculator is configured to evaluate an inclination of each of the parking spaces as the exit hindrance factor.

12. The driving assistance device for the vehicle according to claim 6, wherein the evaluation value calculator is configured to evaluate an inclination of each of the parking spaces as the exit hindrance factor.

13. The driving assistance device for the vehicle according to claim 1,
    wherein the evaluation value calculator is configured to calculate the evaluation value of the parking spaces so that the evaluation value of the parking spaces becomes higher as the exit hindrance factor decreases.

14. The driving assistance device for the vehicle according to claim 1,
    wherein the evaluation value calculator is configured to:
        determine, based on the traveling environment information, whether a possible exit direction from a given parking space among the parking spaces of which evaluation value is to be calculated is two forward and reverse directions, a forward direction, or a reverse direction;
        in response to determining that the possible exit direction is the two forward and reverse directions, calculate the evaluation value of the given parking space as a first value;
        in response to determining that the possible exit direction is the forward direction, calculate the evaluation value of the given parking space as a second value lower than the first value; and
        in response to determining that the possible exit direction is the reverse direction, calculate the evaluation value of the given parking space as a third value lower than the second value.

15. The driving assistance device for the vehicle according to claim 1,
wherein the evaluation value calculator is configured to:
determine, based on the traveling environment information, whether there is snow in a given parking space among the parking spaces of which evaluation value is to be calculated;
in response to determining that there is no snow in the given parking space, calculate the evaluation value of the given parking space as a first value; and
in response to determining that there is snow in the given parking space, calculate the evaluation value of the given parking space as a second value lower than the first value.

16. The driving assistance device for the vehicle according to claim 1,
wherein the evaluation value calculator is configured to:
determine, based on the traveling environment information, whether there is snow in a given parking space among the parking spaces of which evaluation value is to be calculated;
in response to determining that there is no snow in the given parking space, calculate the evaluation value of the given parking space as a first value;
in response to determining that there is snow in the given parking space, determine whether a road surface of the given parking space has compacted snow or noncompacted snow;
in response to determining that the road surface of the given parking space has compacted snow, calculate the evaluation value of the given parking space as a second value lower than the first value; and
in response to determining that the road surface of the given parking space has non compacted snow, calculate the evaluation value of the given parking space as a third value lower than the second value.

17. The driving assistance device for the vehicle according to claim 16,
wherein the evaluation value calculator is configured to:
in response to the determining that there is snow in the given parking space, calculate height from a road surface on which a wheel of the vehicle is in contact to a surface of snow on the given parking space;
when the calculated height is less than or equal to a predetermined value, determine that the road surface of the given parking space has compacted snow; and
when the calculated height is greater than the predetermined value, determine that the road surface of the given parking space has non-compacted snow.

18. The driving assistance device for the vehicle according to claim 1,
wherein the evaluation value calculator is configured to:
determine, based on the traveling environment information, whether an inclination of a road surface of a given parking space among the parking spaces of which evaluation value is to be calculated is flat, downhill in an exit direction, or uphill in the exit direction;
in response to determining that the inclination of the road surface of the given parking space is flat, calculate the evaluation value of the given parking space as a first value;
in response to determining that the inclination of the road surface of the given parking space is downhill in the exit direction, calculate the evaluation value of the given parking space as a second value lower than the first value; and
in response to determining that the inclination of the road surface of the given parking space is uphill in the exit direction, calculate the evaluation value of the given parking space as a third value lower than the second value.

19. The driving assistance device for the vehicle according to claim 1,
wherein the evaluation value calculator is configured to:
determine, based on the traveling environment information, whether a possible exit direction from a given parking space among the parking spaces of which evaluation value is to be calculated is two forward and reverse directions, a forward direction, or a reverse direction;
in response to determining that the possible exit direction is the two forward and reverse directions, calculate a first evaluation value of the given parking space as a first value;
in response to determining that the possible exit direction is the forward direction, calculate the first evaluation value of the given parking space e as a second value lower than the first value;
in response to determining that the possible exit direction is the reverse direction, calculate the first evaluation value of the given parking space as a third value lower than the second value;
determine, based on the traveling environment information, whether there is snow in the given parking space;
in response to determining that there is no snow in the given parking space, calculate a second evaluation value of the given parking space as a fourth value; and
in response to determining that there is snow in the given parking space, calculate the second evaluation value of the given parking space as a fifth value lower than the fourth value;
determine, based on the traveling environment information, whether an inclination of a road surface of the given parking space is flat, downhill in an exit direction, or uphill in the exit direction;
in response to determining that the inclination of the road surface of the given parking space is flat, calculate a third evaluation value of the given parking space as a sixth value;
in response to determining that the inclination of the road surface of the given parking space is downhill in the exit direction, calculate the third evaluation value of the given parking space as a seventh value lower than the sixth value; and
in response to determining that the inclination of the road surface of the pa given parking space is uphill in the exit direction, calculate the third evaluation value of the given parking space as an eighth value lower than the seventh value; and
in response to calculating of the first, second and third evaluation values, calculate the evaluation value by adding the first, second and third evaluation values.

20. A driving assistance device for a vehicle, the driving assistance device comprising circuitry configured to:
recognize traveling environment information related to an outside of the vehicle, in a case where the vehicle has entered a parking lot,
detect parking spaces available to the vehicle based on the traveling environment information, calculate an evaluation value for each of the parking spaces, each of the evaluation value reflecting an exit hindrance factor as an evaluation item, and select, with priority, a parking space for parking the vehicle from among the parking spaces, based on the evaluation value for each of the parking space, wherein the evaluation value of the parking space calculated is higher than the evaluation value for any remaining parking space.

\* \* \* \* \*